United States Patent
Nakamura et al.

(10) Patent No.: US 11,169,090 B2
(45) Date of Patent: Nov. 9, 2021

(54) DIFFRACTED LIGHT REMOVAL SLIT AND OPTICAL SAMPLE DETECTION SYSTEM USING SAME

(71) Applicant: Konica Minolta, Inc., Tokyo (JP)

(72) Inventors: Yukito Nakamura, Hachioji (JP); Takatoshi Kaya, Inagi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/754,231

(22) PCT Filed: Sep. 20, 2018

(86) PCT No.: PCT/JP2018/034784
§ 371 (c)(1),
(2) Date: Apr. 7, 2020

(87) PCT Pub. No.: WO2019/077932
PCT Pub. Date: Apr. 25, 2019

(65) Prior Publication Data
US 2020/0319104 A1   Oct. 8, 2020

(30) Foreign Application Priority Data

Oct. 19, 2017   (JP) .............................. JP2017-202429

(51) Int. Cl.
*G01N 21/552*   (2014.01)
*G01N 21/64*    (2006.01)
*G01N 21/13*    (2006.01)

(52) U.S. Cl.
CPC ....... *G01N 21/553* (2013.01); *G01N 21/6402* (2013.01); *G01N 21/13* (2013.01); *G01N 2021/135* (2013.01)

(58) Field of Classification Search
CPC .. G01N 21/648; G01N 21/554; G01N 21/958; G01N 21/553; G01N 21/658;
(Continued)

(56) References Cited

U.S. PATENT DOCUMENTS 4,335,960 A * 6/1982 Ashcroft ................ G01N 21/90
                                                    356/239.4
5,425,916 A * 6/1995 Beer .................. G01N 21/6402
                                                       110/186
(Continued)

FOREIGN PATENT DOCUMENTS

JP    S57-153250 A    9/1982
JP    H04-32728 A     2/1992
(Continued)

OTHER PUBLICATIONS

PCT, International Search Report for the corresponding application No. PCT/JP2018/034784, dated Dec. 4, 2018, with English translation.

(Continued)

*Primary Examiner* — Hoa Q Pham
(74) *Attorney, Agent, or Firm* — Lucas & Mercanti, LLP

(57) ABSTRACT

The present invention is to provide a diffracted light removal slit and an optical sample detection system including the same, in which diffracted light of excitation light can be reliably removed without affecting reflected light of the excitation light in a sample detection device utilizing the reflected light of the excitation light. A diffracted light removal slit is provided between a light source unit and an excitation light reflector in an optical sample detection system that emits excitation light from the light source unit and also performs predetermined measurement using reflected light of the excitation light reflected at the excitation light reflector. The diffracted light removal slit includes: a main portion provided in a direction substantially perpen- (Continued)

dicular to an optical path of the excitation light; and a sidewall portion extending from an end portion of the main portion and inclined toward an upstream side in an optical path direction of the excitation light.

8 Claims, 8 Drawing Sheets

(58) Field of Classification Search
CPC .. G01N 21/645; G01N 21/64; G01N 21/6428; G01N 21/55; G01N 21/13; G01N 21/6402; G01N 21/94; G01N 2021/135; G01N 21/6439; G01N 2021/6471; G01N 33/553; G01N 33/54373; G01N 33/4366; B01L 3/508; B01L 3/502

USPC ............... 356/445–448, 364, 300, 301, 302; 250/458.1, 234; 422/82.08, 69, 82.05; 435/287.2; 436/524, 164, 172
See application file for complete search history.

(56) References Cited

U.S. PATENT DOCUMENTS

| | | | |
|---|---|---|---|
| 6,201,241 B1 * | 3/2001 | Koike | H01J 37/252 |
| | | | 250/310 |
| 2003/0103208 A1 * | 6/2003 | Quinn | G01N 21/553 |
| | | | 356/445 |
| 2004/0070802 A1 * | 4/2004 | Tanaka | G11B 7/0065 |
| | | | 359/3 |
| 2016/0245746 A1 * | 8/2016 | Noda | G01N 21/648 |

FOREIGN PATENT DOCUMENTS

| | | | |
|---|---|---|---|
| JP | H09-133803 A | | 5/1997 |
| JP | 2000-356586 A | | 12/2000 |
| JP | 2006-242902 A | | 9/2006 |
| JP | 2008-185525 A | * | 8/2008 |
| WO | 2009/007888 A1 | | 1/2009 |
| WO | 2015/064704 A1 | | 5/2015 |

OTHER PUBLICATIONS

EPO, Extended European Search Report for the corresponding European application No. 18869337.8, dated Oct. 27, 2020.

* cited by examiner

DIFFRACTED LIGHT REMOVAL SLIT AND OPTICAL SAMPLE DETECTION SYSTEM USING SAME

CROSS REFERENCE TO RELATED APPLICATION

This Application is a 371 of PCT/JP2018/034784 filed on Sep. 20, 2018 which, in turn, claimed the priority of Japanese Patent Application No. 2017-202429 filed on Oct. 19, 2017, both applications are incorporated herein by reference.

TECHNICAL FIELD

The present invention relates to a diffracted light removal slit and an optical sample detection system using the same adapted to remove diffracted light of excitation light and improve detection accuracy of a measuring target substance in an optical sample detection system that detects the measuring target substance included inside a sensor chip by using a surface plasmon resonance device applying a surface plasmon resonance (SPR) phenomenon, a surface plasmon-field enhanced fluorescence spectroscopy measurement device based on a principle of a surface plasmon-field enhanced fluorescence spectroscopy (SPFS), or the like.

BACKGROUND ART

Conventionally, in a case of detecting an extremely fine substance, various kinds of sample detection devices capable of detecting such a substance by applying a physical phenomenon of the substance are used.

For example, as one of such sample detection devices, it is possible to exemplify a surface plasmon resonance device (hereinafter referred to as an SPR device) in which extremely fine analyte inside a living body is detected by applying a phenomenon of obtaining high optical output by resonance between electrons and light in a fine region like a nanometer level (surface plasmon resonance phenomenon (SPR).

Additionally, another example of such sample detection devices is a surface plasmon-field enhanced fluorescence spectroscopy measurement device (hereinafter referred to as an "SPFS device") applying the surface plasmon resonance (SPR) phenomenon and capable of detecting analyte with higher accuracy than in the SPR device on the basis of the principle of the surface plasmon-field enhanced fluorescence spectroscopy (SPFS).

Such an SPFS device 100 includes, for example, an excitation light irradiation unit 120, a fluorescence detection unit 140, a chip holder 154, a control unit 160, and the like, and is used in a state in which a sensor chip 170 is attached to the chip holder 154 as illustrated in FIG. 8.

The sensor chip 170 includes a dielectric member 172, a metal film 174 formed on the dielectric member 172, and a sample solution holding member 176 fixed on the dielectric member 172 and the metal film 174.

Additionally, ligand used to capture analyte contained in sample solution is uniformly immobilized in a predetermined region (reaction field) on the metal film 174 of the sensor chip 170.

The excitation light irradiation unit 120 includes a light source unit 121, an angle adjustment mechanism 122, and a light source control unit 123.

The light source unit 121 includes at least a light source 125 of excitation light α and a beam shaping optical system 126, for example. In addition, an automatic power-control (APC) mechanism, a temperature adjustment mechanism (both not illustrated), and the like may also be included.

The beam shaping optical system 126 includes a collimator 126a and a slit 126b. In addition, for example, a bandpass filter, a linear polarization filter, a half-wave plate, a zooming means, and the like may be included as appropriate.

The collimator 126a collimates the excitation light α emitted from the light source 125. Furthermore, the slit 126b adjusts a beam diameter, a contour shape, and the like of the excitation light α such that a shape of an irradiation spot on the sensor chip becomes a circle of a predetermined size.

In the SPFS device 100 thus configured, the sample solution containing the analyte is injected into the sample solution holding member 176 of the sensor chip 170, the analyte is captured by the ligand, and a fluorescent substance is excited to generate fluorescence by irradiating the sensor chip 170 with the excitation light α from the excitation light irradiation unit 120 in a state in which the analyte captured by the ligand is labeled with the fluorescent substance. An amount of the analyte is detected by detecting fluorescence γ with the fluorescence detection unit 140.

CITATION LIST

Patent Literature

Patent Literature 1: WO 2015/064704 A1
Patent Literature 2: JP 2006-242902 A

SUMMARY OF INVENTION

Technical Problem

In an excitation light irradiation unit 120 using such a slit 126b, a beam is shaped into a predetermined shape by irradiating the slit 126b with excitation light α from a light source 125, but light diffracted at the slit (diffracted light) is generated.

For this reason, the farther a distance from the slit 126b of the excitation light irradiation unit 120 to an irradiation spot of a sensor chip 170 is, the wider the diffracted light spreads. Since such diffracted light may become a factor that adversely affects measurement in an SPFS device 100, it is preferable to remove the diffracted light.

Normally, as a method of removing such diffracted light, it is conceivable to provide an additional slit on an optical path of the excitation light α. However, in a case of using reflected light of the excitation light α like Patent Literature 1 or Patent Literature 2, when a slit is additionally provided in the vicinity of a mirror or the sensor chip, there is a possibility that the reflected light of the excitation light α is blocked by the slit. On the other hand, in a case where the slit is made small so as not to block the reflected light of the excitation light α, the diffracted light cannot be completely removed in some cases.

The present invention is directed to providing a diffracted light removal slit and an optical sample detection system including the same, in which diffracted light of excitation light can be reliably removed without affecting reflected light of the excitation light in a sample detection device utilizing the reflected light of the excitation light.

Solution to Problem

The present invention is invented to solve the above-described problems in the conventional art, and to achieve at least one of the above-described objects, according to a diffracted light removal slit on which one aspect of the present invention is reflected, is a diffracted light removal slit provided between a light source unit and an excitation light reflector in an optical sample detection system that emits excitation light from the light source unit and further performs predetermined measurement using reflected light of the excitation light reflected at the excitation light reflector, in which the diffracted light removal slit includes:
a main portion provided in a direction substantially perpendicular to an optical path of the excitation light; and
a sidewall portion extending from an end portion of the main portion and inclined toward an upstream side in an optical path direction of the excitation light.

Additionally, an optical sample detection system on which one aspect of the present invention is reflected is an optical sample detection system that detects a sample by irradiating a sensor chip with the excitation light from the light source unit, the sensor chip including:
a dielectric member;
a metal film adjacent to an upper surface of the dielectric member; and
a sample solution holding member arranged on an upper surface of the metal film,
in which
the sensor chip is the excitation light reflector, and
the above-described diffracted light removal slit is provided.

Advantageous Effects of Invention

According to the present invention, the diffracted light removal slit provided between the excitation light irradiation unit and an excitation light reflection surface reliably removes the diffracted light of the excitation light. Furthermore, since the diffracted light removal slit includes the sidewall portion inclined toward the upstream side in the optical path direction of the excitation light, the diffracted light of the excitation light is reliably removed and the reflected light of the excitation light reflected at the excitation light reflection surface is prevented from being blocked by the diffracted light removal slit. For this reason, the diffracted light of the excitation light can be reliably removed without affecting the reflected light of the excitation light even in the sample detection device utilizing the reflected light of the excitation light.

Additionally, since the sidewall portion inclined toward the upstream side in the optical path direction of the excitation light is included as the diffracted light removal slit, it is possible to downsize the diffracted light removal slit in a direction vertical to the optical path of the excitation light, and this can also contribute to miniaturization of the sample detection device.

DESCRIPTION OF EMBODIMENTS

Hereinafter, embodiments (examples) of the present invention will be described in more detail with reference to the drawings.

Figure 1:
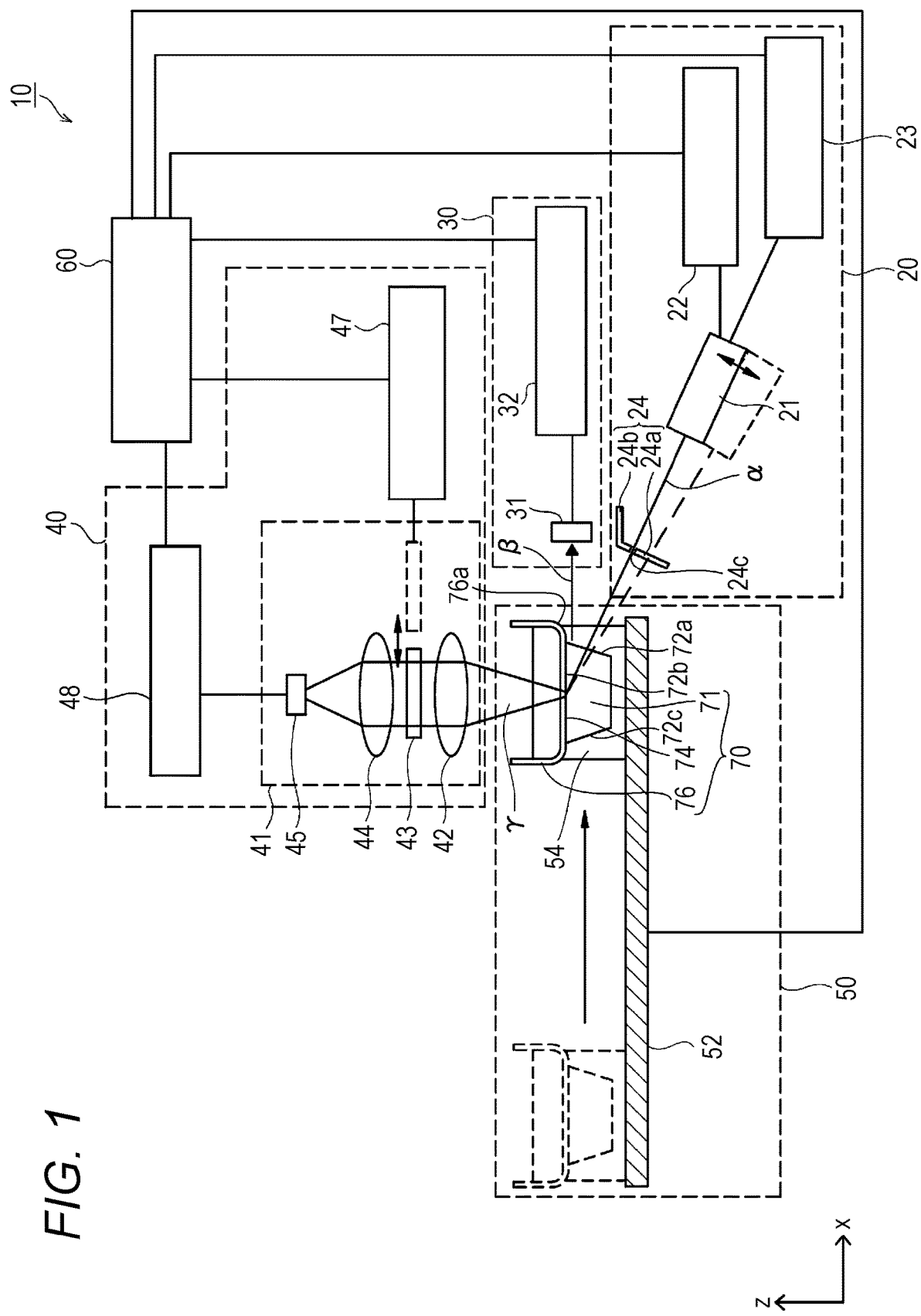
FIG. 1 is a schematic diagram to describe a configuration of a surface plasmon-field enhanced fluorescence spectroscopy measurement device (SPFS device) including a diffracted light removal slit according to an embodiment of the present invention.

FIG. 1 is a schematic diagram to describe a configuration of a surface plasmon-field enhanced fluorescence spectroscopy measurement device (SPFS device) including a diffracted light removal slit according to an embodiment of the present invention.

As illustrated in FIG. 1, an SPFS device 10 includes an excitation light irradiation unit 20, an excitation light detection unit 30, a fluorescence detection unit 40, a conveyance unit 50, and a control unit 60.

The SPFS device 10 is used in a state in which a sensor chip 70 is attached to a chip holder 54 of the conveyance unit 50.

The sensor chip 70 includes: a dielectric member 72 including an incident surface 72a, a film-formed surface 72b, and an emission surface 72c; a metal film 74 formed on the film-formed surface 72b; and a well member 76 that is a sample solution holding member fixed on the film-formed surface 72b or the metal film 74. Normally, the sensor chip 70 is replaced in every sample inspection.

Preferably, the sensor chip 70 is a structural object having each side of a length of about several millimeters to several centimeters but may also be a smaller structural object or a larger structural object not included in a category of a "chip".

The dielectric member 72 can be a prism including a dielectric transparent to the excitation light α. The incident surface 72a of the dielectric member 72 is a surface through which the excitation light α emitted from the excitation light irradiation unit 20 is incident on the inside of the dielectric member 72. Additionally, the metal film 74 is formed on the film-formed surface 72b. The excitation light α that has been incident on the inside of the dielectric member 72 is reflected at an interface between the metal film 74 and the film-formed surface 72b of the dielectric member 72 (hereinafter, referred to as a "back surface of the metal film 74" for convenience), and the excitation light α is emitted to the outside of the dielectric member 72 through the emission surface 72c.

The dielectric member 72 has a shape not particularly limited, and the shape of the dielectric member 72 illustrated in FIG. 1 is a prism having a vertical cross-sectional shape of substantially a trapezoidal hexahedron (truncated quadrangular pyramid), but the shape of the dielectric member can also be a prism having a vertical cross-sectional shape of a triangle (so-called triangular prism), a half circle, or a semi-ellipse.

The incident surface 72a is formed so as not to prevent the excitation light α from returning to the excitation light irradiation unit 20. In a case where a light source of the excitation light α is, for example, a laser diode (hereinafter, also referred to as an "LD"), when the excitation light α returns to the LD, an excitation state of the LD is disturbed and a wavelength and output of the excitation light α fluctuate.

For this reason, an angle of the incident surface 72a is set such that the excitation light α is prevented from being vertically incident on the incident surface 72a in a scanning range centering an ideal enhancement angle. In the present embodiment, an angle between the incident surface 72a and the film-formed surface 72b and an angle between the emission surface 72c and the film-formed surface 72b are both about 80°.

Note that a resonance angle (and an enhancement angle extremely close to the resonance angle) is roughly determined by design of the sensor chip 70. Design elements include a refractive index of the dielectric member 72, a refractive index of the metal film 74, a thickness of the metal film 74, an extinction coefficient of the metal film 74, a wavelength of the excitation light α, and the like. The resonance angle and the enhancement angle are shifted by analyte immobilized on the metal film 74, but an amount thereof is less than several degrees.

The dielectric member 72 has a birefringence characteristic to no small extent. Exemplary materials of the dielectric member 72 include: various kinds of inorganic substances such as glass and ceramics; natural polymers; synthetic polymers; and the like, and a material including silicon dioxide ($SiO_2$) or titanium dioxide ($TiO_2$) is preferable from the viewpoints of chemical stability, production stability, and optical transparency.

Additionally, as far as the dielectric member is formed from a material that is optically transparent to at least the excitation light α, material quality of the dielectric member 72 is not particularly limited as described above, but it is preferable to form the dielectric member from, for example, a resin material in terms of providing the inexpensive and easy-handling sensor chip 70.

In a case of forming the dielectric member 72 from the resin material, it is possible to use, for example: polyesters such as polyethylene terephthalate (PET) and polyethylene naphthalate; polyolefins such as polyethylene (PE) and polypropylene (PP); polycyclic olefins such as cyclic olefin copolymer (COC) and cyclic olefin polymer (COP); vinyl resins such as polyvinyl chloride and polyvinylidene chloride; polystyrene, polyetheretherketone (PEEK), polysulfone (PSF), polyethersulfone (PES), polycarbonate (PC), polyamide, polyimide, acrylic resin, triacetyl cellulose (TAC), and the like.

The metal film 74 is formed on the film-formed surface 72b of the dielectric member 72. With this configuration, interaction (surface plasmon resonance) occurs between free electrons contained in the metal film 74 and photons of the excitation light α incident on the film-formed surface 72b under the condition of total reflection, and local-field light is generated on a surface of the metal film 74.

A material of the metal film 74 is not particularly limited as far as the material is a metal that can cause the surface plasmon resonance, and the metal film is formed from, for example, at least one kind of metal selected from a group including gold, silver, aluminum, copper, and platinum, more preferably formed from gold, and furthermore, the metal film may be formed from an alloy of these metals. Such metals are suitable for the metal film 74 because the metals are stable against oxidation and have an electric field more enhanced by surface plasmon light.

Additionally, a forming method of the metal film 74 is not particularly limited, but examples thereof can include sputtering, vapor deposition (resistance heating vapor deposition, electron beam vapor deposition, etc.), electrolytic plating, electroless plating, and the like. Preferably, it is desirable to use the sputtering and the vapor deposition because metal film forming conditions can be easily adjusted.

The metal film 74 has a thickness not particularly limited, but the thickness in a range of 5 to 500 nm is preferable, and from a viewpoint of an electric field enhancing effect, it is more preferable that the thickness be in a range of 20 to 70 nm in a case of gold, silver, copper, and platinum, in a range of 10 to 50 nm in a case of aluminum, and it is preferable that the thickness be in a range of 10 to 70 nm in a case of an alloy thereof.

In a case where the thickness of the metal film 74 is in the above-mentioned range, the thickness is suitable because the surface plasmon light is easily generated. Additionally, as far as the metal film 74 has such a thickness, a dimension (length×width) and a shape thereof are not particularly limited.

Furthermore, material quality of the well member 76 is not particularly limited, and the well member can be produced from various kinds of materials, for example, a synthetic resin, a metal, ceramics, and the like.

A manufacturing method of the well member 76 is also not particularly limited. For example, the well member can be produced by resin molding, punching, or the like most generally performed.

The well member 76 thus produced can be fixed to the dielectric member 72 by using an adhesive, a matching oil, a transparent adhesive sheet, or the like having a refractive index substantially same as that of the dielectric member 72.

Additionally, although not illustrated in FIG. 1, ligand used to capture the analyte is immobilized on a surface included in the metal film 74 and not facing the dielectric member 72 (hereinafter, referred to as a "surface of the metal film 74" for convenience). Since the ligand is immobilized, the analyte can be selectively detected.

In the present embodiment, the ligand is uniformly immobilized in a predetermined region (reaction field) on the metal film 74. As far as the analyte can be captured, a kind of the ligand is not particularly limited. In the present embodiment, the ligand is an antibody specific to the analyte or a fragment thereof.

As illustrated in FIG. 1, the sensor chip 70 thus configured is attached to the chip holder 54 of the conveyance unit 50 of the SPFS device 10, and a sample is detected by the SPFS device 10.

Next, the respective constituent elements of the SPFS device 10 will be described. As described above, the SPFS device 10 includes the excitation light irradiation unit 20, the excitation light detection unit 30, the fluorescence detection unit 40, the conveyance unit 50, and the control unit 60.

The excitation light irradiation unit 20 emits the excitation light α to the sensor chip 70 held by the chip holder 54. As described later, when fluorescence γ is measured, the excitation light irradiation unit 20 emits, to the incident surface 72a, only a P wave for the metal film 74 such that an incident angle with respect to the metal film 74 becomes an angle that causes surface plasmon resonance.

Here, the "excitation light" is light that directly or indirectly excites a fluorescent substance. For example, when the metal film 74 is irradiated with the excitation light α through the dielectric member 72 at the angle that causes the surface plasmon resonance, the excitation light is the light that generates, on the surface of the metal film 74, local-field light that excites the fluorescent substance. In the SPFS device 10 of the present embodiment, the excitation light α is used as measurement light for position detection and position adjustment of the sensor chip 70. Such excitation light α as the measurement light has a wavelength not particularly limited, but preferably has a wavelength from a visible wide range to a near-infrared range.

Note that a measurement light irradiation unit to emit the measurement light can be provided, although not illustrated, in addition to the excitation light irradiation unit 20 so as to emit the excitation light and the measurement light from the separate units respectively.

The excitation light irradiation unit 20 includes a configuration to emit the excitation light α to the dielectric member 72 and a configuration to scan the incident angle of the excitation light α with respect to the back surface of the metal film 74. In the present embodiment, the excitation light irradiation unit 20 includes a light source unit 21, an angle adjustment mechanism 22, and a light source control unit 23.

The light source unit 21 irradiates the back surface of the metal film 74 with the excitation light α such that a shape of an irradiation spot becomes a substantially circle, and the excitation light α is collimated and has a constant wavelength and a constant light amount. The light source unit 21 includes, for example, a light source 25 of the excitation light α and a beam shaping optical system 26 as illustrated in FIG. 2 and also includes an automatic power control (APC) mechanism and a temperature adjustment mechanism (both not illustrated).

A kind of the light source 25 is not particularly limited, and examples thereof include a laser diode (LD), a light-emitting diode, a mercury lamp, and other laser light sources. In a case where the light emitted from the light source 25 is not a beam, the light emitted from the light source 25 is converted into a beam by a lens, a mirror, a slit, or the like. Additionally, in a case where the light emitted from the light source 25 is not monochromatic light, the light emitted from the light source 25 is converted into monochromatic light by a diffraction grating or the like. Furthermore, in a case where the light emitted from the light source 25 is not linearly-polarized light, the light emitted from the light source 25 is converted into linearly-polarized light by a polarizer or the like.

Figure 2:
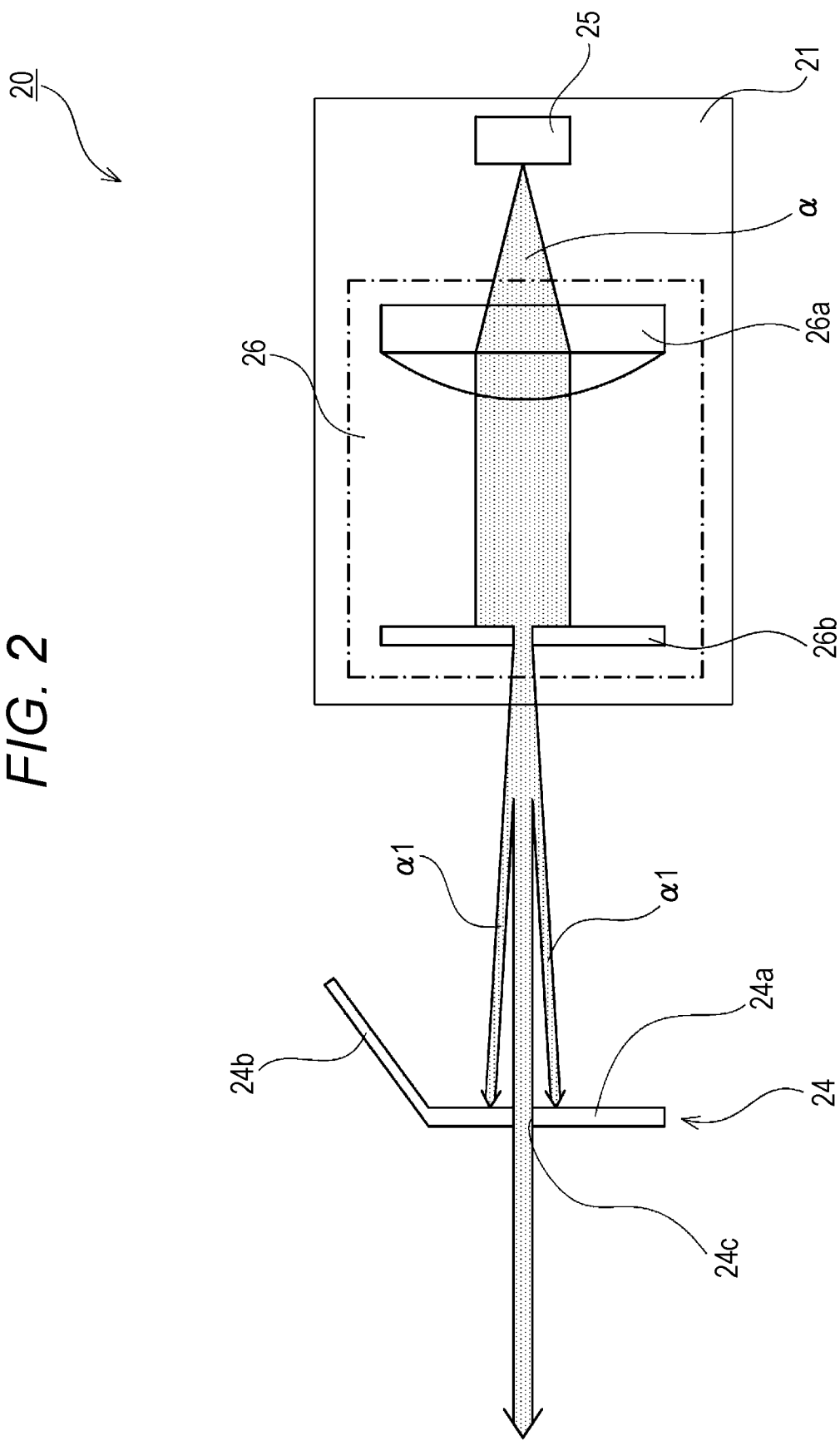
FIG. 2 is a schematic diagram to describe a configuration of an excitation light irradiation unit of the SPFS device illustrated in FIG. 1.

The beam shaping optical system 26 includes a collimator 26a and a slit 26b as illustrated in FIG. 2. Besides these constituent elements, the beam shaping optical system 26 may include a bandpass filter, a linear polarization filter, a half-wave plate, a slit, a zooming means, and the like. Additionally, the beam shaping optical system 26 may include all of these or may include only some of these.

The collimator 26a collimates the excitation light α emitted from the light source 25. The slit 26b and the zooming means adjust a beam diameter and a contour shape of the excitation light α such that the shape of the irradiation spot on the back surface of the metal film 74 becomes a circle of a predetermined size.

The bandpass filter converts the excitation light α emitted from the light source 25 into narrow-band light having only a center wavelength. The reason is that the excitation light α from the light source 25 has a certain wavelength distribution width.

The linear polarization filter converts the excitation light α emitted from the light source 25 into perfect linearly-polarized light. The half-wave plate adjusts a polarization direction of the excitation light α such that a P-wave component is incident on the metal film 74.

The APC mechanism controls the light source 25 such that output of the light source 25 becomes constant. More specifically, the APC mechanism detects an amount of light branched from the excitation light α by using a photodiode (not illustrated) or the like. Then, the APC mechanism controls the output of the light source 25 to be constant by controlling input energy with a recurrent circuit.

The temperature adjustment mechanism is, for example, a heater, a Peltier element, or the like. A wavelength and energy of emission light from the light source 25 may fluctuate depending on a temperature. For this reason, the wavelength and the energy of the emission light from the light source 25 are controlled to be constant by keeping the temperature of the light source 25 constant with the temperature adjustment mechanism.

The angle adjustment mechanism 22 adjusts the incident angle of the excitation light α with respect to the metal film 74. The angle adjustment mechanism 22 relatively rotates an optical axis of the excitation light α and the chip holder 54 in order to emit the excitation light α to a predetermined position of the metal film 74 at a predetermined incident angle through the dielectric member 72.

For example, the angle adjustment mechanism 22 rotates the light source unit 21 around an axis orthogonal to the optical axis of the excitation light α (around an axis vertical to a paper plane of FIG. 1). At this time, a position of the rotation axis is set such that the position of the irradiation spot on the metal film 74 is substantially not changed even though the incident angle is scanned. Deviation of the irradiating position can be minimized by setting a position of a rotation center in the vicinity of an intersection of optical axes of two rays of the excitation light α at both ends of a scanning range of the incident angle (between the irradiating position on the film-formed surface 72b and the incident surface 72a).

An angle at which a maximum light amount of plasmon scattered light can be obtained is an enhancement angle out of the incident angle of the excitation light α with respect to the metal film 74. The fluorescence γ having high intensity can be measured by setting the incident angle of the excitation light α at the enhancement angle or an angle close thereto.

Note that basic incident conditions of the excitation light α are determined by the material and the shape of the dielectric member 72 of the sensor chip 70, the thickness of the metal film 74, the refractive index of the sample solution inside the well member 76, and the like, but optimum incident conditions may slightly fluctuate due to a kind and an amount of the analyte inside the well member 76, a shape error of the dielectric member 72, and the like. For this reason, it is preferable to obtain an optimum enhancement angle in every sample inspection. In the present embodiment, a suitable emission angle of the excitation light α with respect to a normal line of the metal film 74 (straight line in a z-axis direction in FIG. 1) is about 70°.

The light source control unit 23 controls various devices included in the light source unit 21 to control irradiation with the excitation light α of the light source unit 21. The light source control unit 23 includes, for example, a known computer or microcomputer including an arithmetic device, a control device, a storage device, an input device, and an output device.

Additionally, a diffracted light removal slit 24 is provided between the light source unit 21 and the sensor chip 70. The diffracted light removal slit 24 includes: an opaque material, and includes a main portion 24a provided substantially perpendicular to the optical path of the excitation light α; and a sidewall portion 24b extending from an end portion of the main portion 24a and inclined toward an upstream side in an optical path direction of the excitation light α.

The main portion 24a of the diffracted light removal slit 24 is provided with a slit hole 24c used to reshape the excitation light α. It is preferable that the slit hole 24c has a shape substantially same as that of the slit 26b of the above-described beam shaping optical system 26.

Figure 3A:
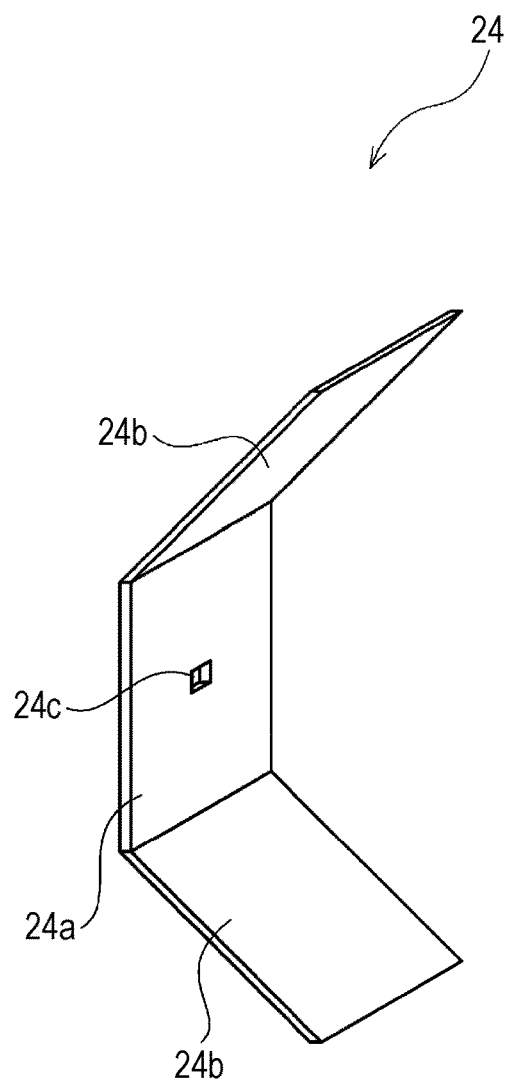
FIG. 3 illustrates schematic views to describe a modified example of a diffracted light removal slit.
Figure 3B:
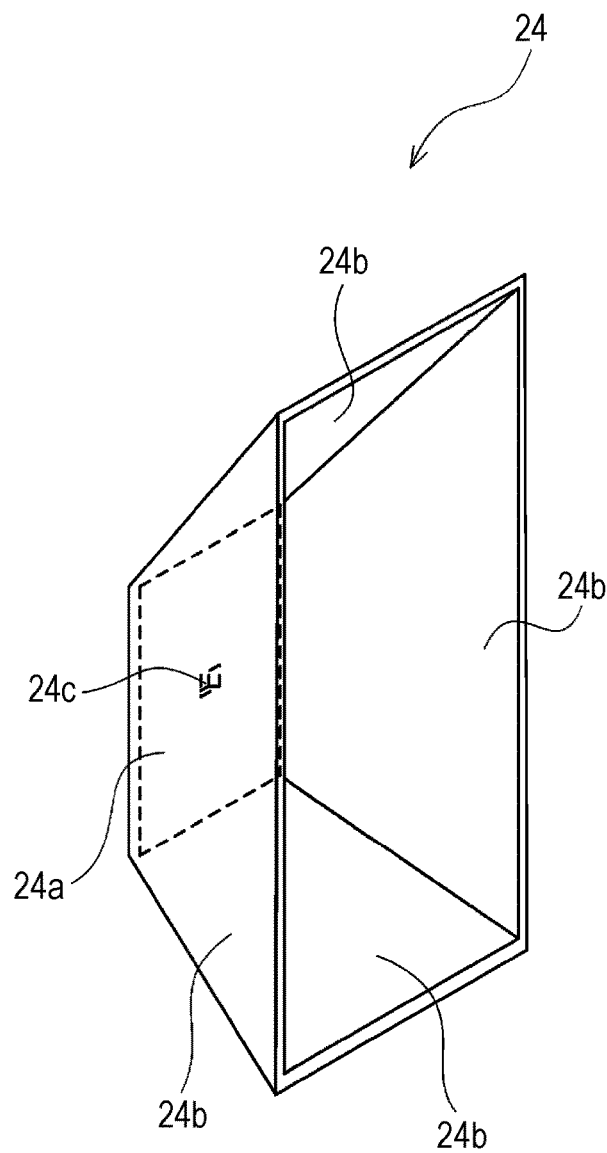

The sidewall portion 24b of the diffracted light removal slit 24 is to be provided at least on the end portion side of the main portion 24a where reflected light β from the sensor chip 70 as described later exists, but not limited thereto, the sidewall portion 24b may extend from each of a plurality of end portions of the main portion 24a as illustrated in FIGS. 3A and 3B, for example. Additionally, in the present example, the main portion 24a is rectangular, but the shape of the main portion 24a is not particularly limited and may be circular or the like.

The diffracted light removal slit 24 may be installed at any position as far as being located between the light source unit 21 and the sensor chip 70, but it is preferable to arrange the diffracted light removal slit 24 as close as possible to the sensor chip 70 from the viewpoint of suppressing influence of diffracted light α1. In the case of installing the diffracted light removal slit 24 in the vicinity of the sensor chip 70, the main portion 24a is made as small as possible and the sidewall portion 24b is made large instead, thereby achieving removal of the diffracted light α1 generated at the slit 26b of the beam shaping optical system 26 without blocking the reflected light β.

The diffracted light removal slit 24 is rotated in conjunction with the light source unit 21 by the angle adjustment mechanism 22. That is, the position of the diffracted light removal slit 24 is adjusted by the angle adjustment mechanism 22 such that the slit hole 24c of the diffracted light removal slit 24 coincides with an optical path axis of the excitation light α.

The excitation light detection unit 30 detects the reflected light β generated at the incident surface 72a of the sensor chip 70 by irradiating the sensor chip 70 with the excitation light α in order to determine a position of the sensor chip 70 at the time of performing optical measurement (for example, enhancement angle detection, measurement of an optical blank value, fluorescence γ detection, and the like). Note that, in the present specification, an element like the sensor chip 70 that reflects the excitation light α will be referred to as an "excitation light reflector", and an interface that reflects the excitation light α will be referred to an "excitation light reflection surface".

Preferably, the excitation light detection unit 30 detects the reflected light β in order to determine the position of the sensor chip 70 before performing initial optical measurement. In many cases, since the initial optical measurement is the enhancement angle detection, it is preferable to detect the reflected light β before the enhancement angle detection. In a case of not performing the enhancement angle detection, the reflected light β is detected before the measurement of the optical blank value. In a case of not performing both the enhancement angle detection and the measurement of the optical blank value, the reflected light β is detected before the fluorescence γ detection. In the present embodiment, the excitation light detection unit 30 detects the reflected light β of the excitation light α. The excitation light detection unit 30 includes a light receiving sensor 31 and a sensor control unit 32.

The light receiving sensor 31 detects the reflected light β of the excitation light α. A kind of the light receiving sensor 31 is not particularly limited as far as being capable of detecting the reflected light β of the excitation light α, and for example, a photodiode (PD) can be used.

Preferably, a light receiving surface of the light receiving sensor 31 has a size larger than the beam diameter of the excitation light α. For example, in a case where the beam diameter of the excitation light α is about 1 to 1.5 mm, the light receiving surface of the light receiving sensor 31 has each side of a length of, preferably, 3 mm or more.

The light receiving sensor 31 is arranged at a position on which the reflected light β of the excitation light α is incident. In the present embodiment, the light receiving sensor 31 is arranged at a position on which the reflected light β from the incident surface 72a of the dielectric member 72 and the reflected light β from a boundary surface 76a of the well member 76 are incident. Preferably, the light receiving sensor 31 is arranged at a position on which the reflected light β of the excitation light α emitted at an angle same as or an angle close thereto at the time of the fluorescence γ detection is incident.

Since the irradiating position with the excitation light α is slightly changed by a change in the incident angle, accuracy in the position determination at the time of detecting the fluorescence γ can be improved by setting the incident angle of the excitation light α to a same angle or an angle close to the same angle between at the time of determining the position of the sensor chip 70 and at the time of the fluorescence γ detection.

In the present embodiment, in a case where the emission angle of the excitation light α with respect to the normal line of the metal film 74 (the straight line in the z-axis direction in FIG. 1) is about 70°, the reflected light β from the incident surface 72a travels in a direction substantially horizontal to a travel direction of a conveyance stage 52 (an x-axis direction in FIG. 1). Therefore, the light receiving sensor 31 is arranged at a position on which the reflected light β traveling in the horizontal direction is incident.

The sensor control unit 32 controls detection of an output value of the light receiving sensor 31, management of sensitivity of the light receiving sensor 31 in accordance with the detected output value, a change in the sensitivity of the light receiving sensor 31 in order to obtain an appropriate output value, and the like. The sensor control unit 32 includes, for example, a known computer or microcomputer including an arithmetic device, a control device, a storage device, an input device, and an output device.

The fluorescence detection unit 40 detects the fluorescence γ generated from a fluorescent substance excited by irradiating the metal film 74 with the excitation light α. Additionally, the fluorescence detection unit 40 also detects, as necessary, plasmon scattered light generated by irradiating the metal film 74 with the excitation light α. The fluorescence detection unit 40 includes, for example, a light receiving unit 41, a position switching mechanism 47, and a sensor control unit 48.

The light receiving unit 41 is arranged in the normal direction of the metal film 74 of the sensor chip 70 (the z-axis direction in FIG. 1). The light receiving unit 41 includes a first lens 42, an optical filter 43, a second lens 44, and a light receiving sensor 45.

The first lens 42 is, for example, a condensing lens and condenses light generated from on the metal film 74. The second lens 44 is, for example, an image forming lens and forms an image of the light condensed at the first lens 42 on a light receiving surface of the light receiving sensor 45.

Optical paths between the two lenses 42 and 44 are substantially parallel optical paths. The optical filter 43 is arranged between the two lenses 42 and 44.

The optical filter 43 guides only a fluorescent component to the light receiving sensor 45 and removes an excitation light component (plasmon scattered light) in order to detect the fluorescence γ with a high S/N. The optical filter 43 includes, for example, an excitation light reflection filter, a short wavelength cut filter, and a bandpass filter. The optical filter 43 is, for example, a filter including a multilayer film that reflects a predetermined light component, but may also be a color glass filter that absorbs a predetermined light component.

The light receiving sensor 45 detects the fluorescence γ. The light receiving sensor 45 is not particularly limited as far as having high sensitivity capable of detecting weak fluorescence γ from a fluorescent substance that labels a very small amount of the analyte, and for example, a photo multiplier tube (PMT), an avalanche photodiode (APD), or the like can be used.

The position switching mechanism 47 switches a position of the optical filter 43 between on an optical path or off the optical path of the light receiving unit 41. Specifically, when the light receiving sensor 45 detects the fluorescence γ, the optical filter 43 is arranged on the optical path of the light receiving unit 41, and when the light receiving sensor 45 detects the plasmon scattered light, the optical filter 43 is arranged off the optical path of the light receiving unit 41. The position switching mechanism 47 includes, for example, a rotation driving unit and a known mechanism (a turntable, a rack-and-pinion, or the like) that moves the optical filter 43 in a horizontal direction by utilizing a rotational motion.

The sensor control unit 48 controls detection of an output value of the light receiving sensor 45, management of sensitivity of the light receiving sensor 45 in accordance with the detected output value, a change in the sensitivity of the light receiving sensor 45 in order to obtain an appropriate output value, and the like. The sensor control unit 48 includes, for example, a known computer or microcomputer including an arithmetic device, a control device, a storage device, an input device, and an output device.

The conveyance unit 50 conveys, to a measurement position, the sensor chip 70 attached to the chip holder 54 by a user, and fixes the same. Here, the "measurement position" represents a position where the excitation light irradiation unit 20 irradiates the sensor chip 70 with the excitation light α and the fluorescence detection unit 40 detects the fluorescence γ generated with the irradiation.

Note that the conveyance unit 50 is also used to change a distance between the sensor chip 70 and the light source unit 21 of the excitation light irradiation unit 20 in a step of position detection and position adjustment described later.

The conveyance unit 50 includes the conveyance stage 52 and the chip holder 54. The chip holder 54 is fixed to the conveyance stage 52 and detachably holds the sensor chip 70. The chip holder 54 has a shape not particularly limited as far as the chip holder can hold the sensor chip 70 and does not interrupt the optical paths of the excitation light α, the reflected light β, and the fluorescence γ. For example, the chip holder 54 includes an opening to let the excitation light α, the reflected light β, and the fluorescence γ pass through.

The conveyance stage 52 can move the chip holder 54 in one direction (the x-axis direction in FIG. 1) and an opposite direction thereof. The conveyance stage 52 is driven by, for example, a stepping motor.

The control unit 60 controls the angle adjustment mechanism 22, the light source control unit 23, the position switching mechanism 47, the sensor control unit 48, and the conveyance stage 52. Additionally, the control unit 60 also functions as a position adjustment unit that identifies the position of the sensor chip 70 held by the chip holder 54 on the basis of a detection result of the excitation light detection unit 30 and moves the sensor chip 70 to an appropriate measurement position by moving the chip holder 54 by using the conveyance stage 52. The control unit 60 includes, for example, a known computer or microcomputer including an arithmetic device, a control device, a storage device, an input device, and an output device.

Figure 4:
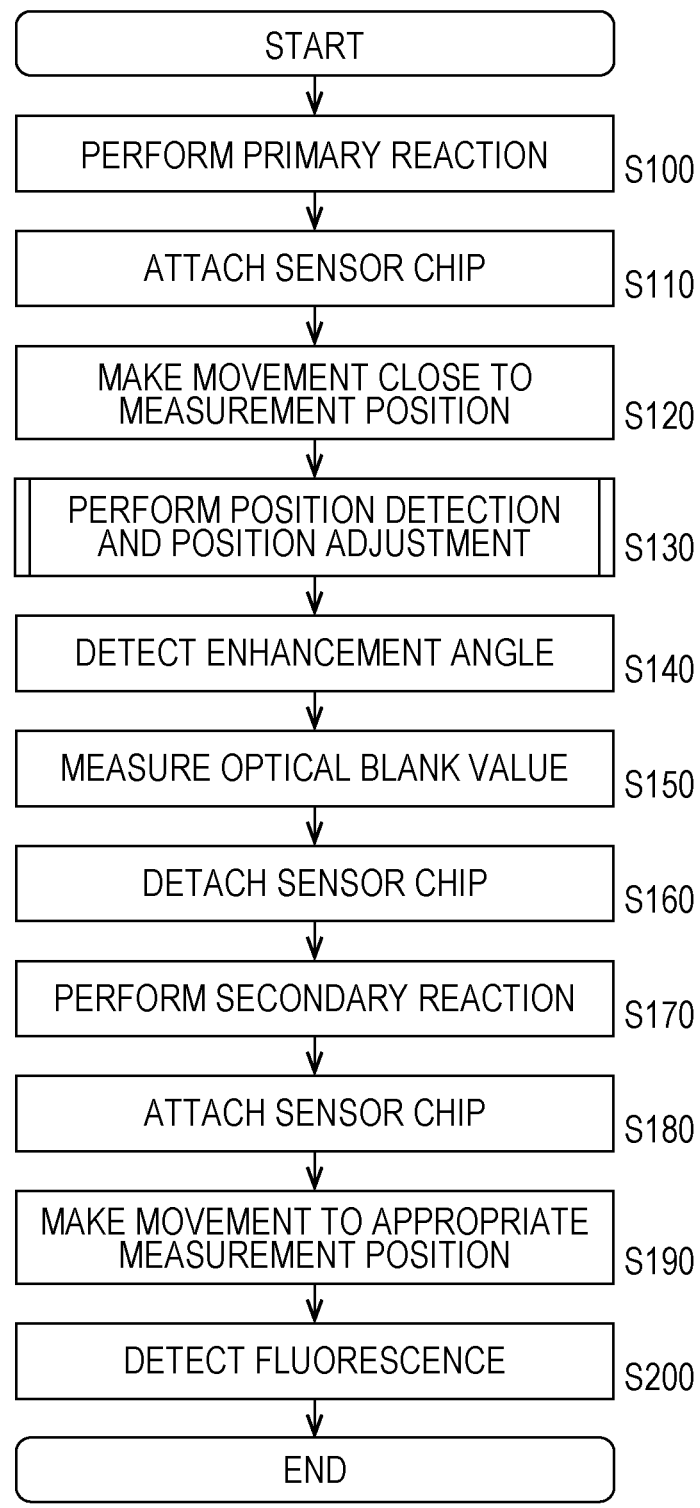
FIG. 4 is a flowchart illustrating an exemplary operational procedure of the SPFS device illustrated in FIG. 1.
Figure 5:
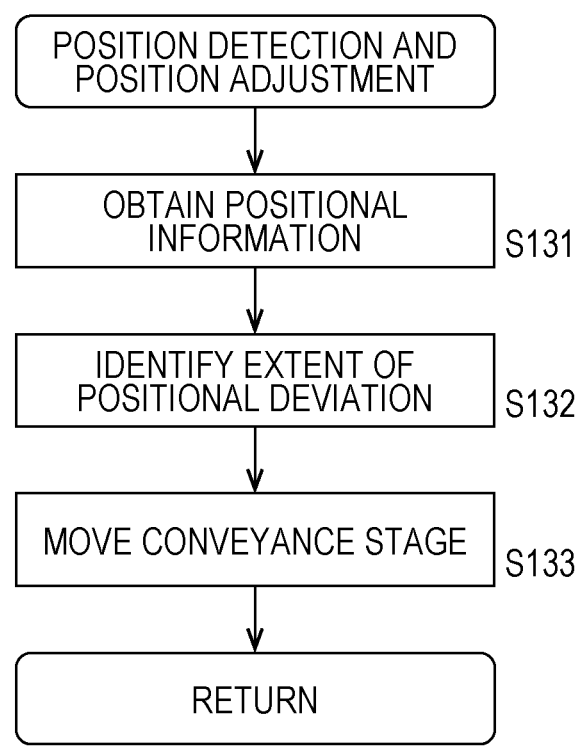
FIG. 5 is a flowchart illustrating steps included in a step of position detection and position adjustment illustrated in FIG. 3.

Hereinafter, a flow of sample detection using the SPFS device 10 will be described. FIG. 4 is a flowchart illustrating an exemplary operational procedure of the SPFS device 10, and FIG. 5 is a flowchart illustrating steps inside the step of the position detection and position adjustment illustrated in FIG. 4.

First, a user injects, into the well member 76, sample solution containing ligand that is uniquely bound to analyte to be a detection target, and immobilizes the ligand on the metal film 74 (primary reaction) and then cleans the well member 76 to remove substances not captured by the ligand (S100).

Note that the sample solution used here is solution prepared by using a sample, and an example thereof can include solution applied with treatment by mixing the sample with a reagent in order to bind a fluorescent substance to the analyte contained inside the sample.

Examples of such a sample include blood, serum, plasma, urine, nasal fluid, saliva, stool, coelomic fluid (cerebrospinal fluid, ascites, pleural effusion, etc.), and the like.

Additionally, examples of the analyte contained inside the sample includes nucleic acids (single stranded or double stranded DNAs, RNAs, polynucleotides, oligonucleotides, PNAs (peptide nucleic acids), etc., or nucleoside, nucleotide, and modified molecules thereof), protein (polypeptides, oligopeptides, etc.), amino acids (including modified amino acids), saccharides (oligosaccharides, polysaccharides, sugar chains, etc.), lipid, or a modified molecule and a complex thereof, and may specifically be a carcinoembryonic antigen such as an α-fetoprotein (AFP), a tumor marker, a signaling substance, a hormone, or the like, and the analyte is not particularly limited.

The sensor chip 70 thus prepared is attached to the chip holder 54 of the conveyance unit 50 located at an attachment/detachment position (S110). The sensor chip 70 attached to the chip holder 54 is conveyed close to the measurement position by the conveyance unit 50 (S120).

At this time, the control unit 60 obtains positional information of the sensor chip 70 and relative positional information between the well member 76 and the dielectric member 72 by operating the excitation light irradiation unit 20, the excitation light detection unit 30, and the conveyance stage 52, and also adjusts the position of the sensor chip 70 on the basis of the obtained positional information (S130).

As illustrated in FIG. 5, in the step of the position detection and position adjustment, the positional information of the sensor chip is obtained first (S131). Then, an extent of positional deviation of the sensor chip 70 from the measurement position is identified on the basis of the positional information of the sensor chip 70 (S132). Next, the sensor chip 70 is arranged at an appropriate measurement position by moving the chip holder 54 by the conveyance stage 52 on the basis of the obtained positional information and the extent of the positional deviation (S133).

FIG. 6 is a schematic diagram to describe the step of obtaining the positional information of the sensor chip 70 (S130).

Figure 6A:
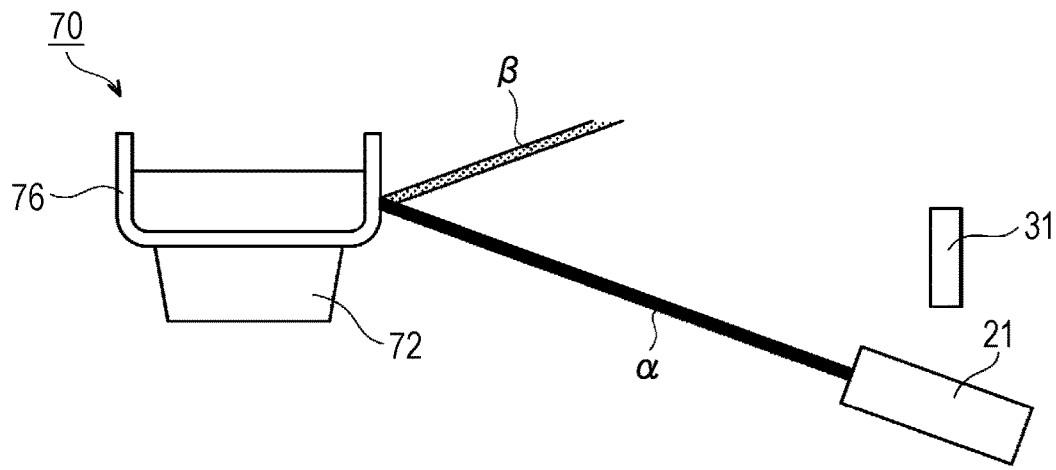
FIG. 6 illustrates schematic diagrams to describe a step of obtaining positional information of a sensor chip (S140).

First, as illustrated in FIG. 6A, when the light source unit 21 emits the excitation light α in a case where the sensor chip 70 is at a position distant from the light source unit 21, the excitation light α is reflected at a side surface of the well member 76 and directed upward. Therefore, the reflected light β from the sensor chip 70 is not incident on the light receiving sensor 31 of the excitation light detection unit 30.

Figure 6B:
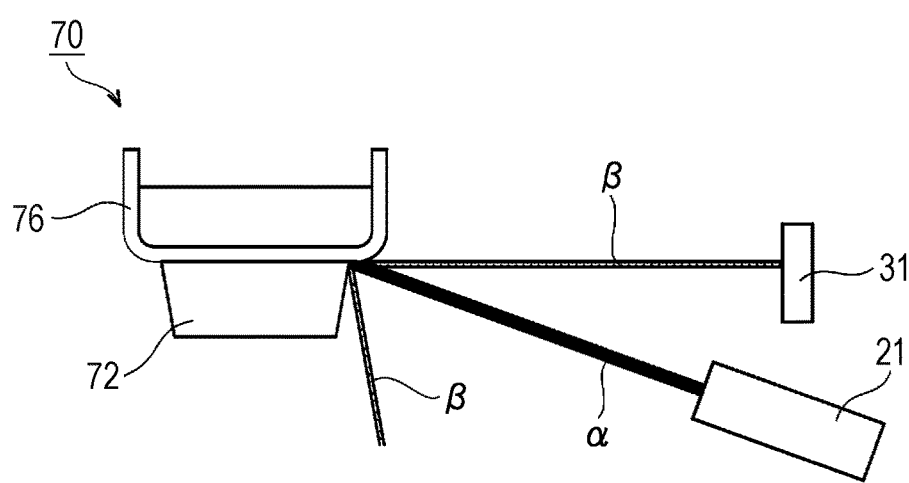

When the sensor chip 70 is moved closer to the light source unit 21, the excitation light α from the light source unit 21 reaches a boundary portion (hereinafter, referred to as an "edge portion") between the well member 76 and the dielectric member 72. In this case, as illustrated in FIG. 6B, the excitation light α (reflected light β) reflected at a bottom surface of the well member 76 is not incident on the light receiving sensor 31, but the excitation light α (reflected light β) reflected at the incident surface 72a of the dielectric member 72 is incident on the light receiving sensor 31. Therefore, the reflected light β from the sensor chip 70 is partly incident on the light receiving sensor 31.

Figure 6C:
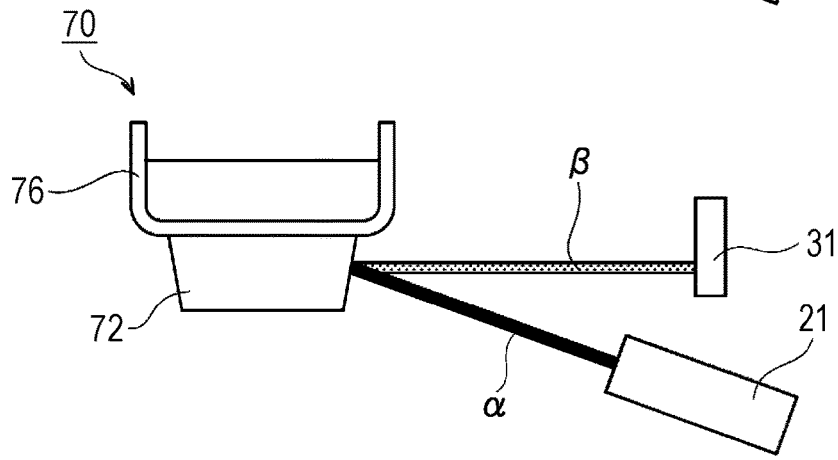

When the sensor chip 70 is further moved closer to the light source unit 21, all of the excitation light α from the light source unit 21 reaches the incident surface 72a of the dielectric member 72. Therefore, all of the reflected light β from the sensor chip 70 is incident on the light receiving sensor 31 as illustrated in FIG. 6C.

Figure 7:
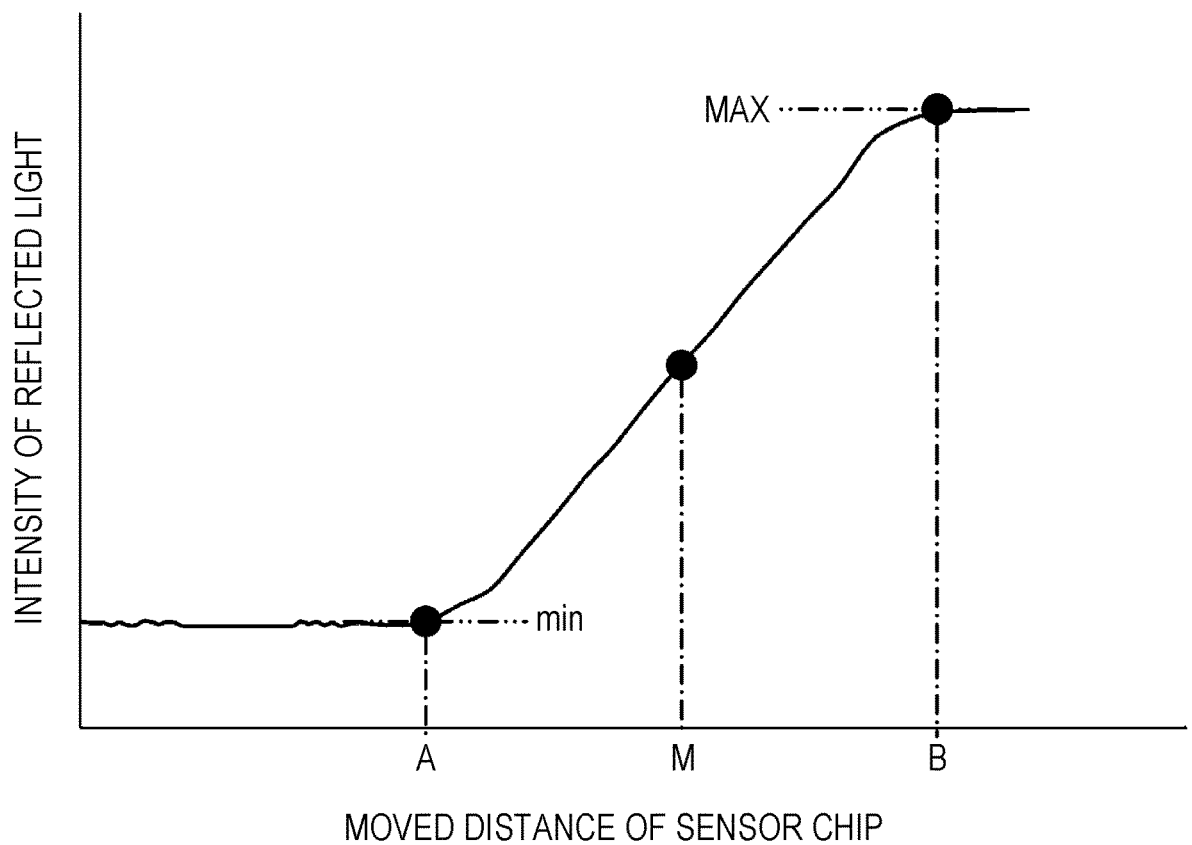
FIG. 7 is a graph illustrating an exemplary detection result of reflected light β by a light receiving sensor.
Figure 8:
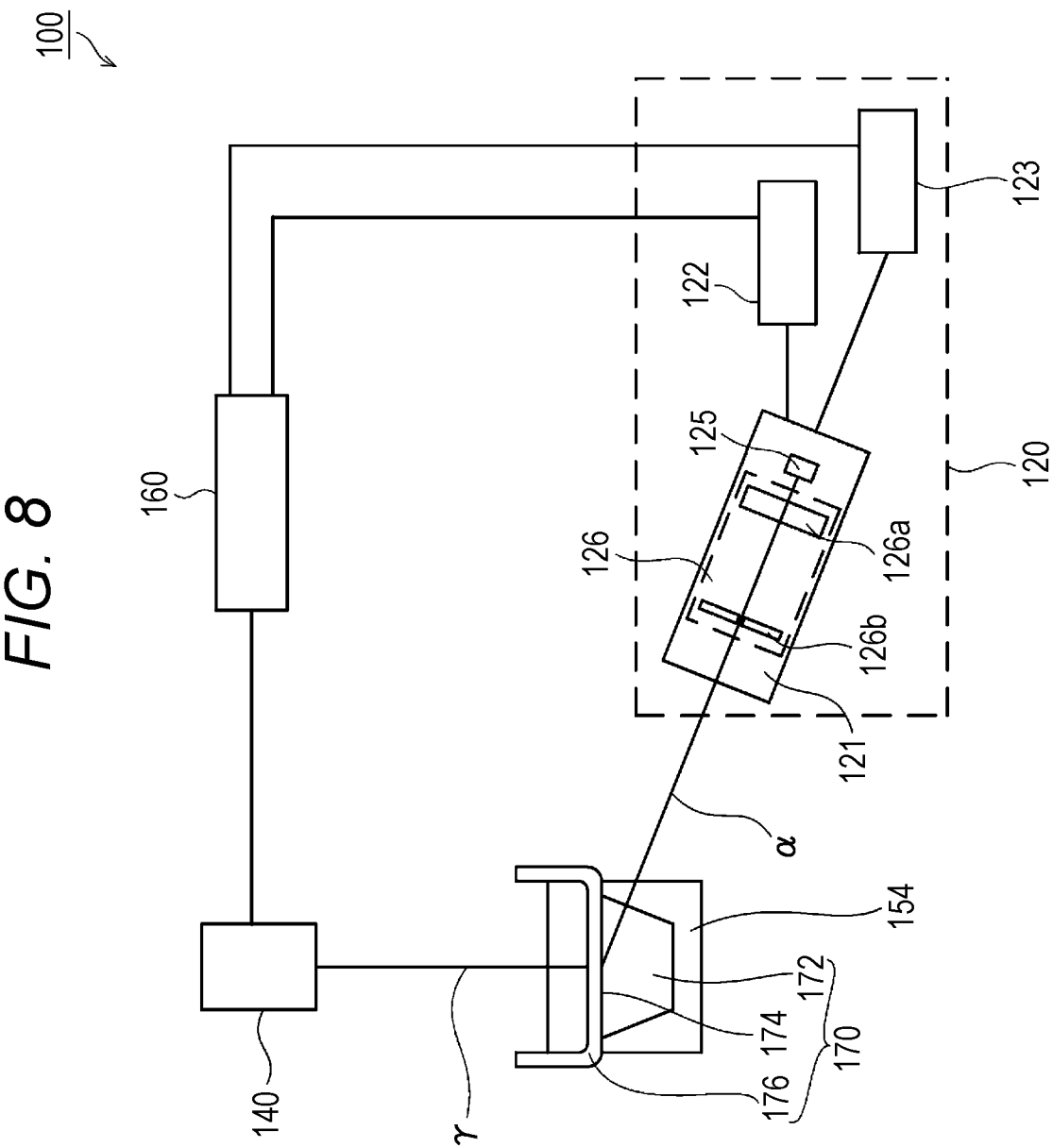
FIG. 8 is a schematic diagram to describe a configuration of a conventional surface plasmon-field enhanced fluorescence spectroscopy measurement device (SPFS device).

FIG. 7 is a graph illustrating an exemplary detection result of the reflected light β by the light receiving sensor 31. In this example, intensity of the reflected light β is measured by the light receiving sensor 31 while moving the sensor chip 70 toward the light source unit 21 by the conveyance stage 52. The excitation light α has a beam diameter of about 1 to 1.5 mm.

As illustrated in FIG. 7, when the sensor chip 70 is moved closer to the light source unit 21, a light amount of the reflected light β incident on the light receiving sensor 31 from a position A is gradually increased. The reason is that the excitation light α is partly reflected at the incident surface 72a and incident on the light receiving sensor 31 as illustrated in FIG. 6B.

Then, when the sensor chip 70 is moved over a position B, the light amount of the reflected light β incident on the light receiving sensor 31 becomes substantially constant. The reason is that, as illustrated in FIG. 6C, all of the excitation light α is reflected at the incident surface 72a of the dielectric member 72 and all of the reflected light β is incident on the light receiving sensor 31.

Therefore, an inclined portion between the position A and the position B illustrated in FIG. 7 coincides with timing when the excitation light α passes through the edge portion. Note that a width of the inclined portion corresponds to the beam diameter (about 1 to 1.5 mm) in the x-axis direction of the excitation light α.

Here, a position M, which is a midpoint between the position A and the position B, can be identified as an edge portion, that is, a position of an end portion of the dielectric member 72. Note that the position M may be simply set as the midpoint between the position A and the position B, but the position of the edge portion can be more correctly identified by: obtaining a minimum value of the light amount of the reflected light β (corresponding to the light amount at the position A) and a maximum value of the light amount of the reflected light β (corresponding to the light amount at the position B) in the graph illustrated in FIG. 7; calculating an average value thereof; and detecting a position to be the average value in the inclined portion. Positional information of this position M is defined as edge portion positional information.

The position of the sensor chip 70 can be identified by the edge portion positional information, and it is possible to detect whether or not the sensor chip 70 is correctly arranged at the measurement position.

In a case where the sensor chip 70 is not arranged at the measurement position, the conveyance stage 52 is actuated to move the sensor chip 70 to the measurement position. Normally, since a distance between the position of the edge portion and a region to be irradiated with the excitation light α on the back surface of the metal film 74 (the region on the back side of the reaction field) is fixed, the sensor chip 70 can be arranged at the appropriate measurement position by moving the chip holder 54 by a predetermined distance from the position of the edge portion by using the conveyance stage 52.

Note that, in a case where the sensor chip 70 is arranged in a manner deviated in a height direction (the z-axis direction) (for example, in a case where a foreign matter is sandwiched between the sensor chip 70 and the chip holder 54) also, the sensor chip 70 can be arranged at the appropriate measurement position by moving the chip holder 54 in the x-axis direction by the predetermined distance from the position of the edge portion. Note that the control unit 60 stores the appropriate measurement position.

Thus, in a state in which the sensor chip 70 is arranged at the appropriate measurement position, the control unit 60 operates the excitation light irradiation unit 20 and the fluorescence detection unit 40 to irradiate the sensor chip 70 with the excitation light α and also detects the plasmon scattered light having the wavelength same as that of the excitation light α to detect the enhancement angle (S140).

Specifically, the control unit 60 operates the fluorescence detection unit 40 to detect the plasmon scattered light while operating the excitation light irradiation unit 20 to scan the incident angle of the excitation light α with respect to the metal film 74. At this time, the control unit 60 operates the position switching mechanism 47 to arrange the optical filter 43 off the optical path of the light receiving unit 41. Then, the control unit 60 determines, as the enhancement angle, the incident angle of the excitation light α when the light amount of the plasmon scattered light becomes maximum.

Next, the control unit 60 operates the excitation light irradiation unit 20 and the fluorescence detection unit 40 to irradiate, with the excitation light α, the sensor chip 70 arranged at the appropriate measurement position, and also records an output value (optical blank value) of the light receiving sensor 45 (S150).

At this time, the control unit 60 operates the angle adjustment mechanism 22 to set the incident angle of the excitation light α to the enhancement angle. Additionally, the control unit 60 operates the position switching mechanism 47 to arrange the optical filter 43 on the optical path of the light receiving unit 41.

Next, the control unit 60 operates the conveyance stage 52 to move the sensor chip 70 to the attachment/detachment position, and the user detaches the sensor chip 70 from the chip holder 54 (S160).

Then, the user introduces, into the well member 76, liquid (labeling solution) containing a secondary antibody labeled with the fluorescent substance (S170). Inside the well member 76, the analyte captured on the metal film 74 is labeled with the fluorescent substance by an antigen-antibody reaction (secondary reaction). After that, the inside of the well member 76 is cleaned to remove free fluorescent substances and the like.

Then, the user attaches the sensor chip 70 to the chip holder 54 located at the attachment/detachment position again (S180). The sensor chip 70 attached to the chip holder 54 is conveyed by the conveyance unit 50 to the appropriate measurement position stored in the control unit 60 (S190).

Note that, at this time, the sensor chip 70 can also be arranged at the appropriate measurement position by performing the control similar to the above-described step S130 without using the information of the appropriate measurement position stored in the control unit 60.

Next, the control unit 60 operates the excitation light irradiation unit 20 and the fluorescence detection unit 40 to irradiate, with the excitation light α, the sensor chip 70 arranged at the appropriate measurement position, and also detects the fluorescence γ released from the fluorescent substance that labels the analyte captured by the ligand (S200). If necessary, conversion into an amount or a concentration of the analyte can be performed on the basis of the intensity of the detected fluorescence γ.

With the above-described procedures, existence or the amount of the analyte in the sample solution can be detected.

Note that the position detection and the position adjustment (S130), the enhancement angle detection (S150), and the optical blank value measurement (S160) may be performed before the primary reaction (S100).

Additionally, in a case where the incident angle of the excitation light α is determined in advance, the enhancement angle detection (S150) may be omitted. In this case, the position detection and the position adjustment of the sensor chip 70 (S130) are performed before the optical blank value measurement (S160). Thus, it is preferable that the position detection and the position adjustment of the sensor chip 70 (S130) be performed before initially performing the optical measurement (the enhancement angle detection, the measurement of the optical blank value, and the fluorescence detection).

Furthermore, in the above description, the secondary reaction of labeling the analyte with the fluorescent substance (S170) is performed after the primary reaction of reacting the analyte with the ligand (S100) (two-step method). However, timing of labeling the analyte with the fluorescent substance is not particularly limited.

For example, labeling solution may be added to the sample solution to label the analyte with the fluorescent substance in advance to the introduction of the sample solution into the well member 76. Also, the analyte labeled with the fluorescent substance is captured by the ligand by injecting the sample solution and the labeling solution into the well member 76 at the same time. In this case, the analyte is labeled with the fluorescent substance and also the analyte is captured by the ligand.

In either case, both the primary reaction and the secondary reaction can be completed by introducing the sample solution into the well member 76 (one-step method). In a case of thus adopting the one-step method, the enhancement angle detection (S150) is performed before the antigen-antibody reaction, and furthermore, the position detection and the position adjustment of the sensor chip are performed (S130 and S140) therebefore.

While the preferred embodiment of the present invention has been described above, the present invention is not limited thereto, and for example, the diffracted light removal slit and the optical sample detection system using the same according to the present invention are applicable to an optical sample detection system other than the SPFS device like the SPR device although the SPFS device has been described in the above-described embodiment.

Furthermore, in the above-described embodiment, the case of adopting the well member as the sample solution holding member has been described, but as described above, as far as the sample solution holding member includes the boundary surface through which the excitation light α reflected at the boundary surface can be incident on the light receiving sensor 31 of the excitation light detection unit 30, the sample solution holding member is not particularly limited, and various kinds of modifications can be made within the scope not departing from the object of the present invention, such as adopting a flow path lid in a flow path type sensor chip.

REFERENCE SIGNS LIST

10 SPFS device
20 Excitation light irradiation unit
21 Light source unit
22 Angle adjustment mechanism
23 Light source control unit
24 Diffracted light removal slit
24a Main portion
24b Sidewall portion
24c Slit hole
25 Light source
26 Beam shaping optical system
26a Collimator
26b Slit
30 Excitation light detection unit
31 Light receiving sensor
32 Sensor control unit
40 Fluorescence detection unit
41 Light receiving unit
42 Lens
43 Optical filter
44 Lens
45 Light receiving sensor
47 Position switching mechanism
48 Sensor control unit
50 Conveyance unit
52 Conveyance stage
54 Chip holder
60 Control unit
70 Sensor chip
72 Dielectric member
72a Incident surface
72b Film-formed surface
72c Emission surface
74 Metal film
76 Well member
76a Boundary surface
100 SPFS device
120 Excitation light irradiation unit
121 Light source unit
122 Angle adjustment mechanism
123 Light source control unit
125 Light source
126 Beam shaping optical system
126a Collimator
126b Slit
140 Fluorescence detection unit
154 Chip holder
160 Control unit
170 Sensor chip 172 Dielectric member
174 Metal film
176 Sample solution holding member

The invention claimed is:

1. A diffracted light removal slit provided between a light source unit and an excitation light reflector in an optical sample detection system that emits excitation light from the light source unit and further performs predetermined measurement using reflected light of the excitation light reflected at the excitation light reflector, the diffracted light removal slit comprising:
    a main part provided in a direction substantially perpendicular to an optical path of the excitation light from the light source unit; and
    a sidewall part extending from an end part of the main part and inclined toward an upstream side in an optical path direction of the excitation light from the light source unit,
    wherein the slit is not on an optical path of the reflected light.

2. The diffracted light removal slit according to claim 1, wherein the sidewall part is provided at least on an end part side of the main part where the reflected light exists.

3. The diffracted light removal slit according to claim 2, wherein the light source unit includes:
    a light source that emits the excitation light;
    a collimator that collimates the excitation light emitted from the light source; and
    a slit that shapes a shape of the collimated excitation light.

4. An optical sample detection system that detects a sample by irradiating a sensor chip with excitation light from a light source unit, the sensor chip comprising:
    a dielectric member;
    a metal film adjacent to an upper surface of the dielectric member; and
    a sample solution holding member arranged on an upper surface of the metal film,
    wherein the sensor chip is the excitation light reflector, and
    the diffracted light removal slit according to claim 2 is provided.

5. The diffracted light removal slit according to claim 1, wherein the light source unit includes:
    a light source that emits the excitation light;
    a collimator that collimates the excitation light emitted from the light source; and
    a slit that shapes a shape of the collimated excitation light.

6. An optical sample detection system that detects a sample by irradiating a sensor chip with excitation light from a light source unit, the sensor chip comprising:
    a dielectric member;
    a metal film adjacent to an upper surface of the dielectric member; and
    a sample solution holding member arranged on an upper surface of the metal film,
    wherein the sensor chip is the excitation light reflector, and
    the diffracted light removal slit according to claim 5 is provided.

7. An optical sample detection system that detects a sample by irradiating a sensor chip with excitation light from a light source unit, the sensor chip comprising:
    a dielectric member;
    a metal film adjacent to an upper surface of the dielectric member; and
    a sample solution holding member arranged on an upper surface of the metal film,
    wherein the sensor chip is the excitation light reflector, and
    the diffracted light removal slit according to claim 1 is provided.

8. The optical sample detection system according to claim 7, further comprising an excitation light detector that detects, out of the reflected light, reflected light traveling in a predetermined direction.

* * * * *